United States Patent
Guim Bernat

(10) Patent No.: US 12,132,661 B2
(45) Date of Patent: Oct. 29, 2024

(54) SYSTEM, APPARATUS AND METHOD FOR ADVANCED MONITORING IN AN EDGE SYSTEM

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 853 days.

(21) Appl. No.: 17/005,449

(22) Filed: Aug. 28, 2020

(65) Prior Publication Data
US 2020/0396168 A1 Dec. 17, 2020

(51) Int. Cl.
*H04L 47/2441* (2022.01)
*H04L 45/00* (2022.01)
*H04L 47/783* (2022.01)
*H04L 47/80* (2022.01)

(52) U.S. Cl.
CPC .......... *H04L 47/2441* (2013.01); *H04L 45/38* (2013.01); *H04L 47/783* (2013.01); *H04L 47/801* (2013.01)

(58) Field of Classification Search
CPC ............................ H04L 47/2441; H04L 45/38
See application file for complete search history.

(56) References Cited

U.S. PATENT DOCUMENTS

| | | | | |
|---|---|---|---|---|
| 10,489,543 B1 * | 11/2019 | Lysaght | ................ | G06F 30/331 |
| 2015/0046512 A1 | 2/2015 | Ashby et al. | | |
| 2016/0330301 A1 * | 11/2016 | Raindel | ................ | H04L 63/0485 |
| 2018/0287902 A1 * | 10/2018 | Chitalia | ................ | H04L 43/045 |
| 2018/0288503 A1 | 10/2018 | Chayat et al. | | |
| 2019/0387634 A1 | 12/2019 | Aspnes et al. | | |
| 2020/0012604 A1 | 1/2020 | Agarwal et al. | | |
| 2020/0153756 A1 * | 5/2020 | Thyamagondlu | ....... | G06F 13/28 |
| 2020/0344143 A1 * | 10/2020 | K | ................ | H04L 49/3063 |

(Continued)

FOREIGN PATENT DOCUMENTS

EP          3382546 A1     10/2018

OTHER PUBLICATIONS

Intel Corporation, "White Paper—New-Generation Central Office (NGCO)," 2019, 13 pages total.

(Continued)

*Primary Examiner* — Yemane Mesfin
*Assistant Examiner* — Salma Ayad
(74) *Attorney, Agent, or Firm* — Trop, Pruner & Hu, P.C.

(57) ABSTRACT

In one embodiment, an apparatus includes: a monitor circuit to monitor traffic of a plurality of sources through the apparatus and maintain telemetry information regarding the traffic based at least in part on telemetry rules received from the plurality of sources, wherein the monitor circuit is to determine whether to send a callback message to a selected one of the plurality of sources, the callback message including telemetry information associated with the traffic of the selected source through the apparatus; and a storage coupled to the monitor circuit, the storage to store the telemetry information, wherein the monitor circuit is to access the telemetry information from the storage. Other embodiments are described and claimed.

17 Claims, 11 Drawing Sheets

(56) References Cited

U.S. PATENT DOCUMENTS

2021/0400527 A1* 12/2021 Notargiacomo .. H04W 28/0284
2022/0278911 A1* 9/2022 Padala ................... H04L 41/40

OTHER PUBLICATIONS

Intel Corporation, Kerry Zhang, et al., "White Paper—Implementing A High Performance BNG With Intel Universal NFVI Packet Forwarding Platform Technology," Jun. 2019, 10 pages.
U.S. Appl. No. 16/887,087, filed May 29, 2020, entitled "System, Apparatus And Method For Adaptive Peer-To-Peer Communication With Edge Platform", by Francesc Guim Bernat.
U.S. Appl. No. 16/882,833, filed May 26, 2020, entitled "System, Apparatus And Method For Persistently Handling Memory Requests In A System", by Francesc Guim Bernat.
Intel Corporation, "Technology Brief: Data Center Memory and Storage Hierarchy, Intel Optane Technology," Date Unknown, 2 pages total.
European Patent Office, Office Action mailed Dec. 21, 2021 in European Patent Application No. 21188328.5 (9 pages).

* cited by examiner

SYSTEM, APPARATUS AND METHOD FOR ADVANCED MONITORING IN AN EDGE SYSTEM

TECHNICAL FIELD

Embodiments relate to monitoring in a system.

BACKGROUND

Current and future generations of edge cloud architectures have capabilities to efficiently and flexibly connect multiple functions and services using pooled resources. For example a cloud services provider may provide pooled memory that may be accessed by multiple functions and/or services through one or more edge systems to efficiently process workloads. While individual client systems have capabilities to effectively monitor operation using performance monitoring tools, such monitoring becomes difficult in an edge cloud architecture where flexible data movement and sharing across multiple edge cloud entities may occur.

DETAILED DESCRIPTION in various embodiments, cloud-based edge architectures are provided with monitoring capabilities to flexibly and effectively monitor traffic traveling through such architectures. To this end, various sources that communicate with a cloud-based edge architecture may specify advanced monitoring rules. In turn, monitoring circuitry may perform monitoring of traffic flow at a fine-grained level. In this way, specific traffic patterns and effects on resource usage can be monitored. Although embodiments are not limited in this regard, example cloud-based edge architectures may communicate using interconnects and switches in accordance with a Compute Express Link (CXL) specification such as the CXL 1.1 Specification or any future versions, modifications variations or alternatives to a CXL specification.

Further, while an example embodiment described herein is in connection with CXL-based technology, embodiments may be used in other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

In a CXL implementation, fine-grained monitoring of traffic flows of different communication protocols that are sent along CXL interconnects can occur. For example, there may be separate traffic flows including so-called CXL.cache, CXL.io and CXL.mem communication protocols that can be finely monitored. For example, a given entity may register a monitoring rule to dictate a particular communication protocol to be monitored, as well as identification of source/destination pairs for which monitoring is to be applied. Still further, monitoring can be controlled to enable monitoring for only certain intervals of time, certain address ranges, and so forth.

More generally, embodiments may be used to monitor traffic including communication of data and messages via multiple interconnect protocols, including a CXL protocol as described herein. For example, the interconnect may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

Figure 1:
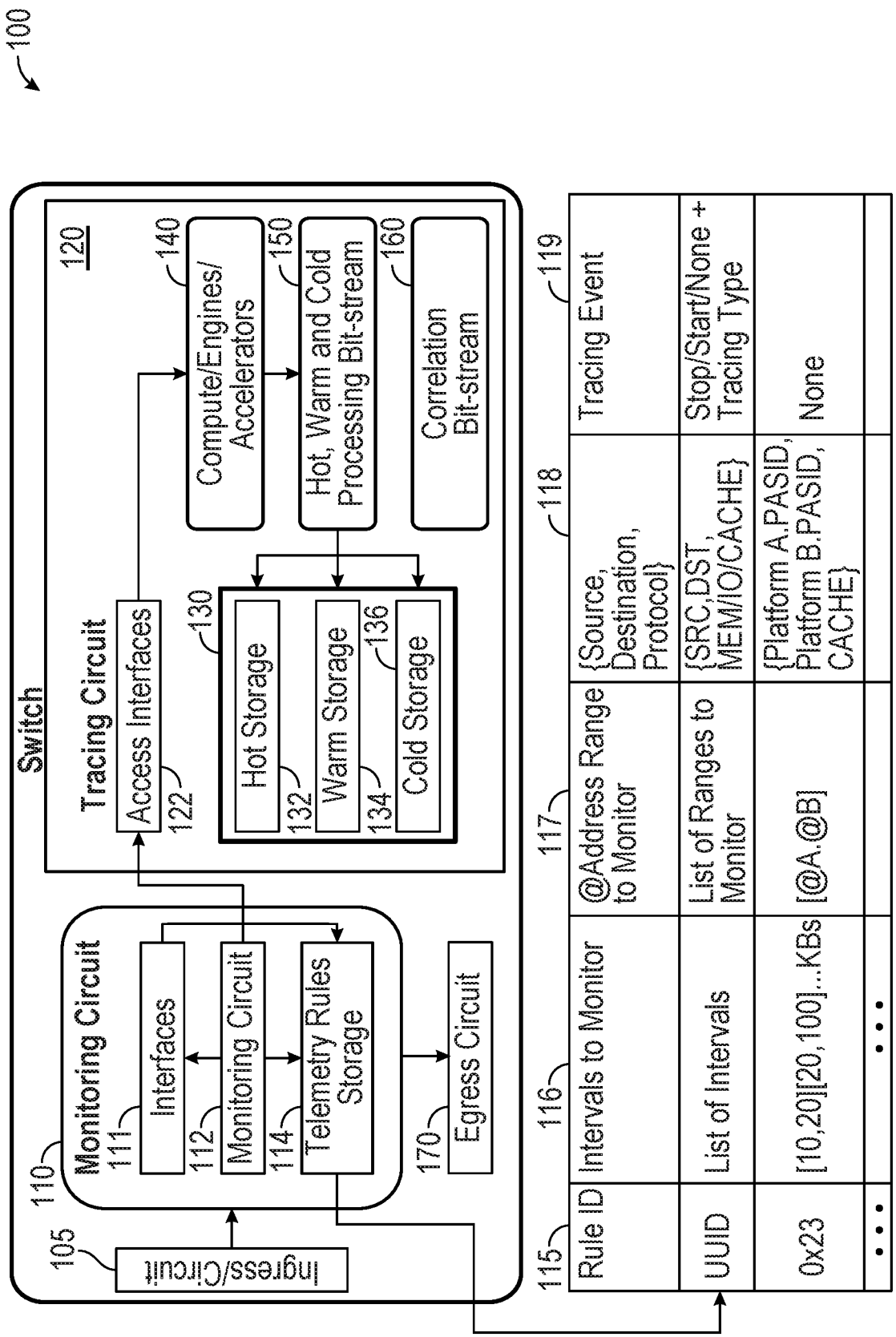
FIG. 1 is a block diagram of a switch in accordance with an embodiment.

Referring now to FIG. 1, shown is a block diagram of a switch in accordance with an embodiment. More specifically, switch 100 is a CXL switch to couple to a variety of devices including at least one host device and one or more other devices. Further, while FIG. 1 shows a high level view of a CXL switch, understand that embodiments are not limited in this regard and similar circuitry may be incorporated in other devices including other switch types, as well as a variety of other devices to leverage embodiments as described herein.

As illustrated, switch 100 includes an ingress circuit 105 that is configured to receive incoming packets from one or more devices, such as a host system and one or more other devices. In general, ingress circuit 105 may perform various processing on the packets. After such processing, the processed packets are provided to a monitor circuit 110. As illustrated, monitor circuit 110 may include one or more interfaces 111, a monitor control circuit 112, and a telemetry rule storage 114. Interfaces 111 may be exposed to various software stacks running on devices or compute platforms connected to switch 100. Embodiments may enable communication between such external devices and switch 100 in order to configure monitoring. In embodiments, only software stacks having the right level of privilege may have access to such monitoring resources, such as may be done via certificate authentication or another authentication method.

In general, monitor circuit 110 is configured to process each incoming request against a set of telemetry rules. Based on this analysis, monitor circuit 110 may generate callbacks if needed or activate tracing. After processing within monitor circuit 110, packets may be passed to an egress circuit 170, where they may be directed along towards a destination. Note that in some implementations, processing within monitor circuit 110 may add too much overhead to each transaction if performed in-line. To this end, ingress circuit 105 may copy messages to monitor circuit 110 before sending them to egress circuit 170. In this case, monitor circuit 110 may include buffering elements to buffer the requests to be processed. It could even consider dropping some of the requests, in an embodiment.

Shown in inset in FIG. 1 are example entries in telemetry rule storage 114. As illustrated, each entry may include multiple fields, including an ID field 115, an interval field 116, an address range field 117, a metadata field 118, and a tracing event field 119. In an embodiment, each rule thus is defined by: a unique ID to be stored in ID field 115, which is assigned by monitor control circuit 112 and returned as part of this call; a list of intervals stored in interval field 116 that assert the rule and the metric associated to that rule (e.g., this could [10,30] gigabytes per second (GBs) or [100,N] nanoseconds (ns) of latency); a list of address ranges stored in address field 117 to be monitored by that flow (in this case, only requests matching those ranges apply to the intervals); source, destination and protocol to monitor, as stored in field 118, and tracing event information stored in tracing event field 119. In an embodiment, both source and destination may be defined by a platform ID and process address space ID (PASID) or any other field that is part of the request that can be used to identify the source of that request and the target. Tracing event information may be used to identify whether the rule is to start, stop or do nothing with respect to tracing that flow. In an embodiment, interfaces 111 also may enable update or deletion of any existing rule within telemetry rule storage 114, e.g., using a corresponding identifier of the rule, which may be a universally unique ID (UUID).

In addition, monitor circuit 110 is configured to perform monitoring regarding traffic through switch 100 based at least in part on the telemetry rules stored in telemetry rule storage 114. To this end, monitor circuit 100 may maintain, e.g., in a monitor storage within monitor circuit 100 or coupled thereto telemetry information regarding traffic from multiple sources for flows that fall within the telemetry rules stored in telemetry rule storage 114. As telemetry information may take the form of one or more data sets, these portions of which can be provided to various requesters such as in connection with a callback.

As further illustrated in FIG. 1, monitor circuit 110 couples to a tracing circuit 120. In embodiments herein, when monitor circuit 110 determines that a given packet is subject to a tracing event, e.g., as determined based on one or more rules present in telemetry rule storage 114, monitor circuit 110 may send the packet to tracing circuit 120 to process. Although embodiments are not limited in this regard, such tracing events may include a tracing start or tracing stop, among others. In addition, based on processing in monitoring control circuit 112, one or more data sets also may be sent to tracing circuit 120.

Tracing circuit 120 may be configured to generate traces that can be accessed at any time by the different authenticated software stacks or elements connected to switch 100. Understand that while tracing circuit 120 is shown included inside switch 100, in other embodiments the tracing circuit could be another discrete device connected to the switch itself.

As illustrated, tracing circuit 120 includes an access interface circuit 122 that may direct tracing events and/or data sets to appropriate destinations within tracing circuit 120. To this end, access interface circuit 122 may provide an interface that allows access to existing tracing data stored in switch 100. To this end, tracing circuit 120 may include one or more storages 130 to store various tracing information. Storage 130 may, in an environment be separated into multiple independent storages, each associated with a type of tracing data. In the embodiment shown in FIG. 1, such storages may include warm storage 132, a cold storage 134, and a hot storage 136.

As examples, access interface circuit 122 may provide information as to: type of data to be accessed (e.g., warm, cold and hot); time stamps or range; and delete on access capabilities. In an embodiment, hot tracing may be used to generate more summarized data (hence having less footprint but can be accessed quickly). In turn, warm tracing may have more detail and be accessed slower, while cold tracing is closer to (or is) raw data coming from monitor circuit 110. Note that more than three levels could be present in an embodiment. Access interface circuit 122 also may enable registering a set of binaries or bit-streams 150 that can run on compute elements or accelerators 140 to process the data coming from monitor circuit 110. In addition to such bitstreams or binaries to perform tracing regarding message flows and data set processing, an additional correlation bitstream 160 may be provided. In embodiments, correlation bitstream 160 may execute on a given computing element/accelerator 142 to correlate information received from a given source with the monitoring data information to correlate activity within a given source with traffic flow through switch 100. Understand while shown at this high level in the embodiment of FIG. 1, many variations and alternatives are possible.

Figure 2:
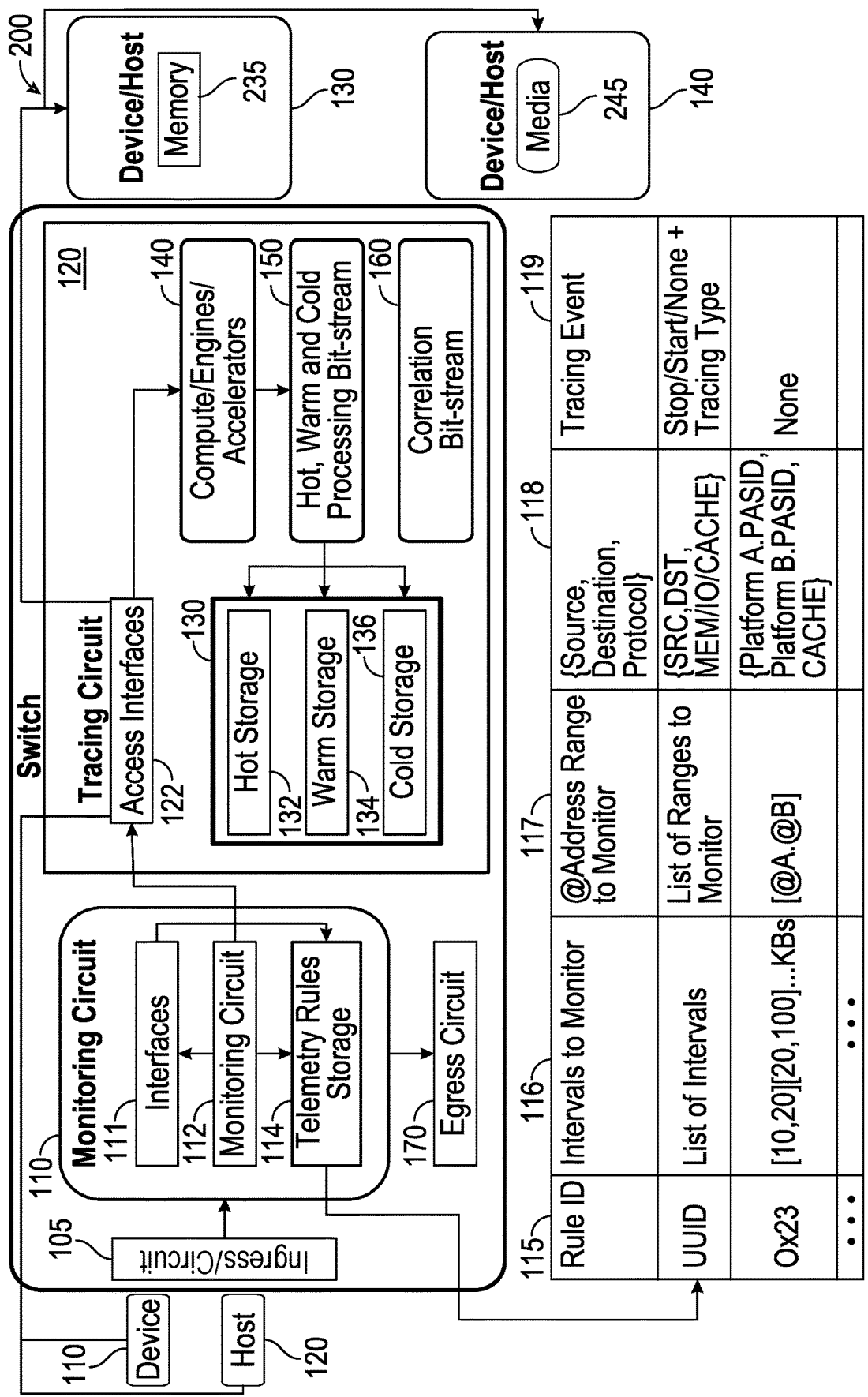
FIG. 2 is a block diagram of a switch in accordance with an embodiment.

For example, it is possible to provide alternate storage locations for pre-processed tracing data, such as one or more external storages to store this information. Referring now to FIG. 2, shown is a block diagram of a system in accordance with an embodiment. As illustrated in FIG. 2, in a system 200, which may be part of an edge appliance, data center architecture or so forth, switch 100 is shown coupled to a host 120 and multiple devices 110, 130, and 140. As illustrated, device 130 may act as a host or another device including a memory 235 to store telemetry information. As illustrated, this information may be sent to device 130 via a CXL.mem communication protocol. In turn, device 140 may act as a host or another device including a media 245 to store telemetry information. In different cases, media storage (either memory or storage) may be hosted in switch 100. Understand that one or potentially more media storage-based block type of ranges may be included in these storages. In some cases, tracing may be stored in a circular way for the memory range. If there is any overflow on the allocated space, an interrupt or callback to a management stack can be provided.

With an arrangement as in FIG. 2, one or potentially more memory ranges exposed in one or more devices or hosts can store tracing data. In this way, particular hosts or device can request that particular telemetry from switch 100 goes into a local address space that they can access.

In the embodiment of FIG. 2, one or more hosts or devices may include out of band channels (either specific lanes or authenticated channels) that allow certain or all host and devices to push telemetry information into switch 100. In this way, embodiments may enable correlation schemes between this traffic from the host/device and CXL traffic. To this end, switch 100, via correlation bitstream 160, may perform correlations between activity in host/device and the traffic received in switch 100. As examples, correlation bitstream 160 may include various models such principal component analysis (PCA), Markovian, etc.

Figure 3:
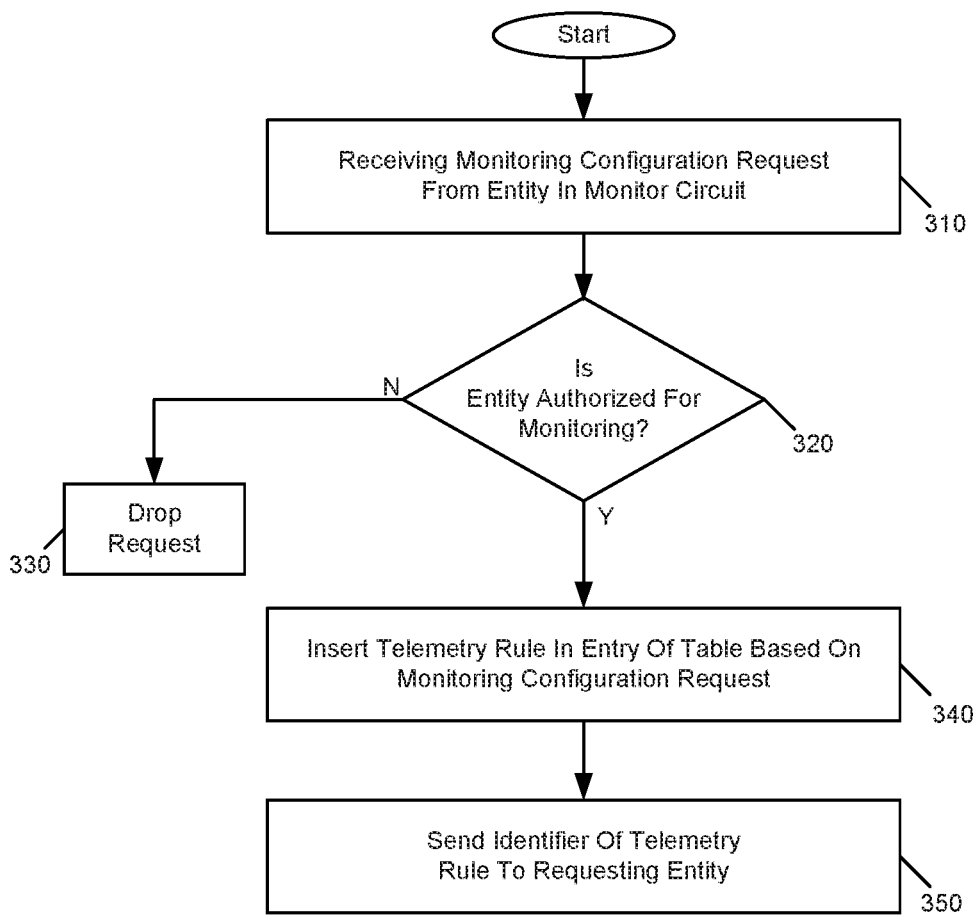
FIG. 3 is a flow diagram of a method in accordance with an embodiment.

Referring now to FIG. 3, shown is a flow diagram of a method in accordance with an embodiment. More specifically, method 300 of FIG. 3 is a method for configuring a monitor circuit with telemetry rules for a given entity. As an example, this entity may be a device, platform or other hardware coupled to a switch including a monitor circuit in accordance with an embodiment. As such, method 300 may be performed by hardware circuitry, firmware, software and/or combinations thereof.

Method 300 begins by receiving a monitoring configuration request from an entity in the monitor circuit (block 310). In an embodiment, this request may be received via a CXL link, and more particularly the request may be according to a CXL.io Still with reference to FIG. 3, next assuming that the entity is authorized for monitoring, control passes to block 340 where a telemetry rule may be inserted. More specifically, this telemetry rule may be inserted into an entry of a telemetry rule table. Such table may be stored in a storage of the monitor circuit or in another circuit coupled to the monitor circuit. This entry may include information in various fields, such as the fields as illustrated in FIG. 1 above. To enable the requesting entity to thereafter send information to be associated with this telemetry rule, the switch may send an identifier of the telemetry rule to the requesting entity (block 350). At this point, the monitor circuit is appropriately configured to monitor incoming communications from the requesting entity and accordingly, method 300 may conclude. And if the entity is not authorized, the request may be dropped at block 330. Understand while shown at this high level in the embodiment of FIG. 3, many variations and alternatives are possible.

Figure 4:
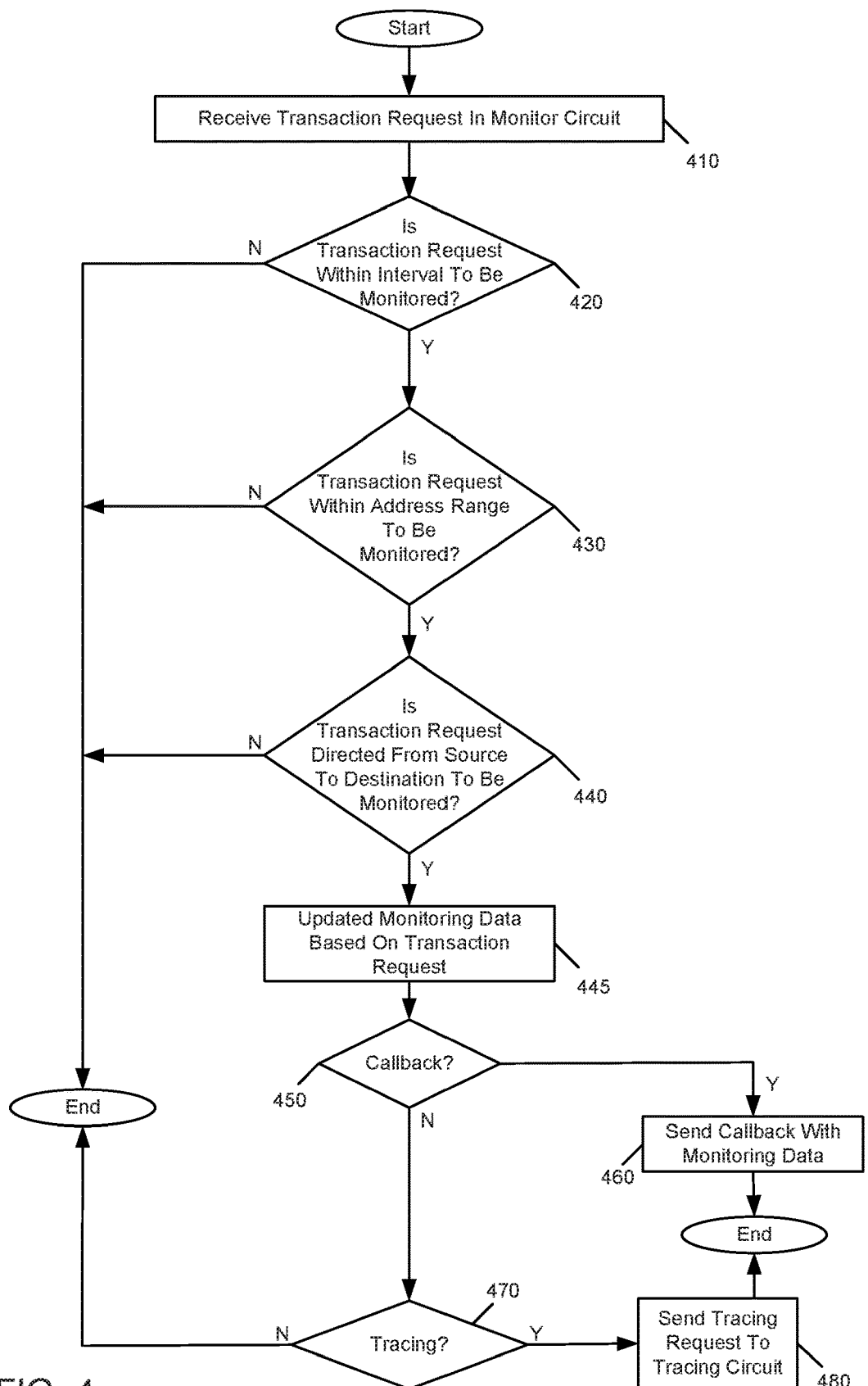
FIG. 4 is a flow diagram of a method in accordance with another embodiment.

Referring now to FIG. 4, shown is a flow diagram of a method in accordance with another embodiment. More specifically, method 400 of FIG. 4 is a method for operating a monitor circuit to handle incoming transaction requests based on telemetry rules in accordance with an embodiment. As such, method 400 may be performed by hardware circuitry, firmware, software and/or combinations thereof.

As shown, method 400 begins by receiving a transaction request in a monitor circuit (block 410). In an embodiment, such request may be received from a given device or host coupled to the switch. Understand that this transaction request is from a device that has at least one telemetry rule requested within the monitor circuit. Accordingly, next at diamond 420 the monitor circuit may determine whether the transaction request is within an interval to be monitored. This determination may be based upon information in at least one telemetry rule and the request itself. If so, control next passes to diamond 430 where the monitor circuit may determine whether the transaction request is within an address range to be monitored. If so, control next passes to diamond 440 where the monitor circuit may determine whether the transaction request is for a source/destination combination to be monitored. If the transaction request is not within all of the interval, address range and source/destination combination to be monitored, no further operation occurs.

When it is determined that the transaction request is one for which monitoring is to occur, the monitor circuit may monitor activity with regard to this transaction request and maintain telemetry information (e.g., as to bandwidth, cache latency, etc.). Thus at block 445, the monitor circuit may update monitoring data based on the transaction request. For example, one or more counters may be incremented, timers updated or so forth.

Still with reference to FIG. 4, control next passes from block 445 to diamond 450 to determine whether a callback is in order for this transaction request. As one example, the callback may be indicated if a given monitoring data exceeds (or falls below) a threshold, as specified in a telemetry rule. If so, at block 460 a callback may be sent with monitoring data. Accordingly, method 400 may conclude. Otherwise if a callback is not in order, next it may be determined whether tracing for this transaction request is to occur (diamond 470). If so, control passes to block 480 where a tracing request may be sent to a tracing circuit from the monitor circuit. As such, this transaction request may undergo tracing within the tracing circuit. Understand while shown at this high level in the embodiment of FIG. 4, many variations and alternatives are possible. For example, while FIG. 4 shows an implementation in which a determination as to tracing activity is predicated on the transaction request to request initiation (or termination) of a tracing operation, in other cases this tracing activity may occur in response to information in a telemetry rule. As one example, based on a given telemetry rule, tracing activity may occur in response to a callback.

Figure 5:
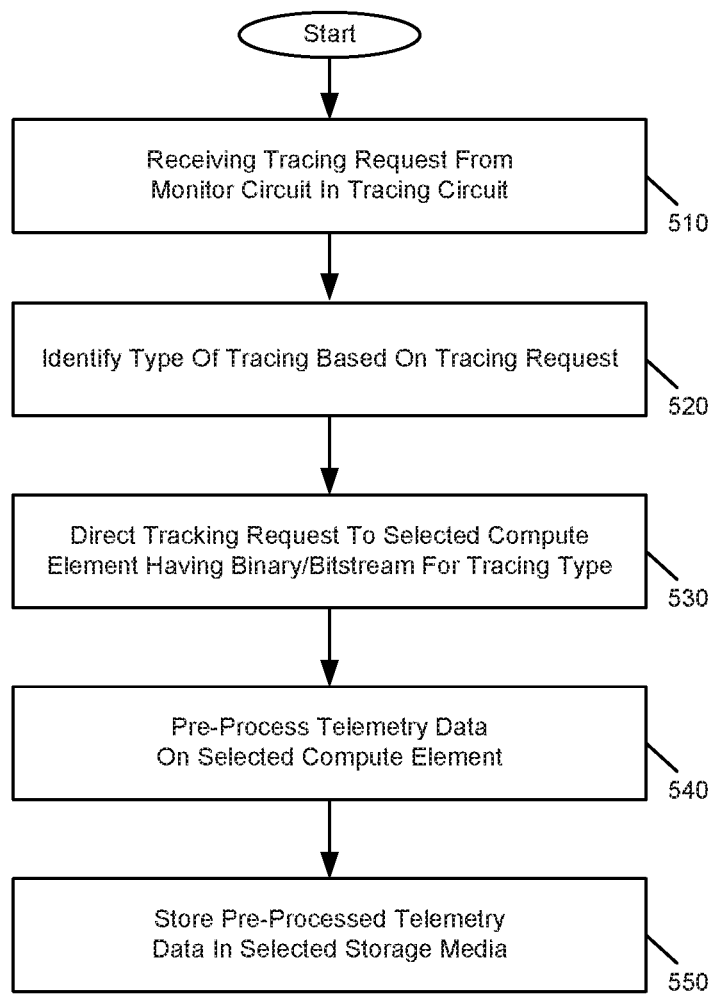
FIG. 5 is a flow diagram of a method in accordance with yet another embodiment.

Referring now to FIG. 5, shown is a flow diagram of a method in accordance with yet another embodiment. More specifically, method 500 of FIG. 5 is a method for performing tracing in a tracing circuit in accordance with an embodiment. As such, method 500 may be performed by hardware circuitry, firmware, software and/or combinations thereof.

As shown in FIG. 5, method 500 begins by receiving a tracing request in a tracing circuit from a monitor circuit (block 510). Next, control passes to block 520 where a type of tracing may be identified based on the tracing request. In this regard, the monitor circuit may identify a particular type of tracing request, e.g., to be one of a hot, warm or cold tracing operation. Then at block 530 the tracing circuit may direct the tracing request to a selected compute element. More specifically, based on the type of tracing request, the tracing circuit may direct the tracing request to a given one of multiple compute elements/accelerators that have been programmed with a corresponding bitstream or binary to handle the particular tracing request. Then at block 540 this compute element/accelerator may pre-process the telemetry data. Finally, at block 550 the telemetry data may be stored in a selected storage medium. This storage may be included within the tracing circuit itself, within a switch including the tracing circuit, or a device coupled to the switch that has the storage medium. Understand while shown at this high level in the embodiment of FIG. 5, many variations and alternatives are possible.

Figure 6:
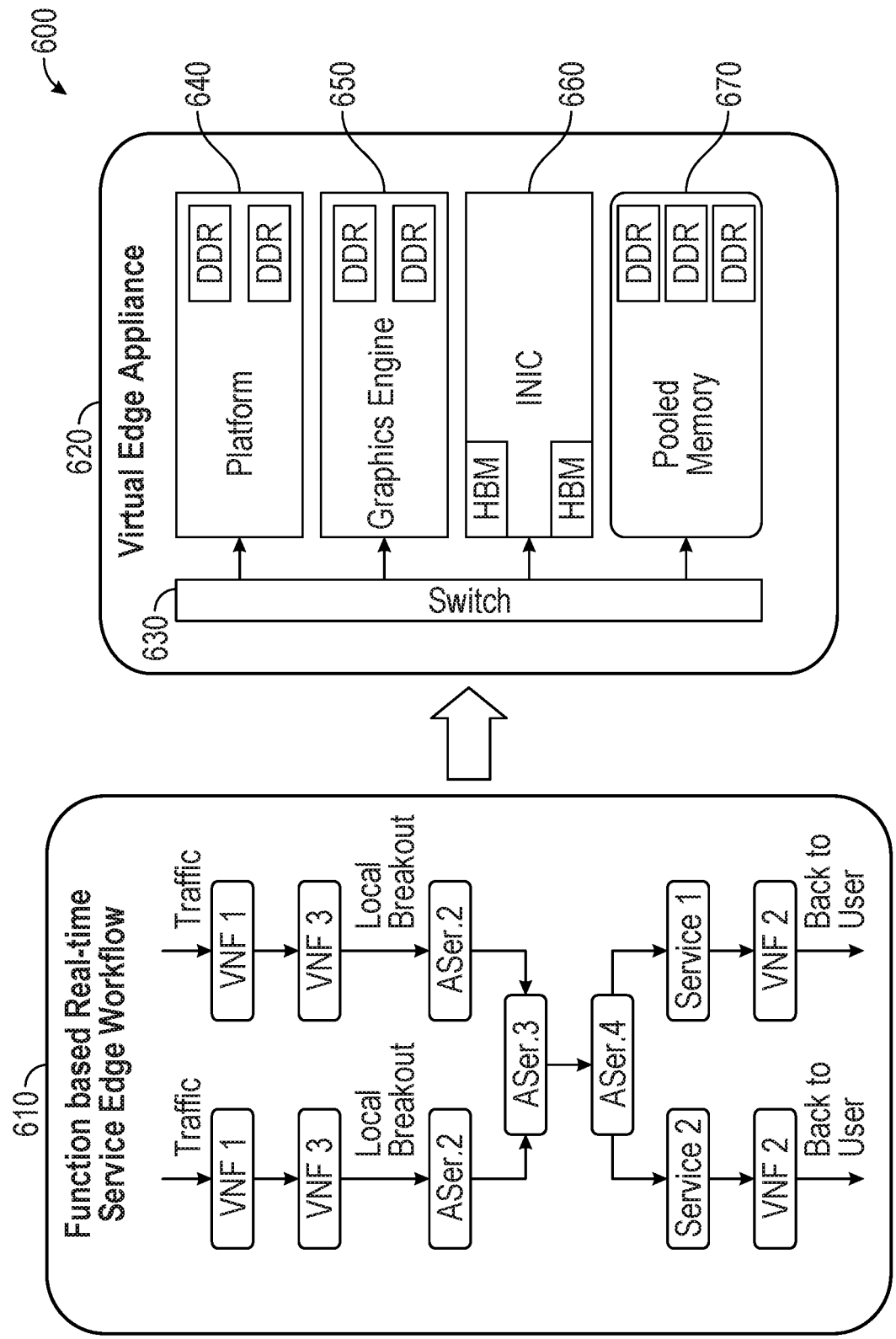
FIG. 6 is a block diagram of a system in accordance with an embodiment.

Referring now to FIG. 6, shown is a block diagram of a system in accordance with an embodiment. As shown in FIG. 6, system 600 may be part of a data center architecture that includes a large plurality of servers, storage devices, accelerators, pooled memories among many other such components. In the high level shown in FIG. 6, a virtual edge appliance 620 is illustrated that includes a switch 630 in accordance with an embodiment.

As one example, edge appliance 620 may provide for edge cloud base station-centric workloads. Such workloads that may be received according to a workflow 610, which as illustrated is a function-based real-time service edge workflow. As seen, incoming traffic into workflow 610 may be received from multiple virtual network functions (VNFs) (namely respective functions VNF1 and VNF3). In turn, the traffic through these VNF's passes through a local breakout and asynchronous services 2-4. In turn, the resulting workflows pass through independent services 1 and 2 and the additional VNF (VNF2) back to a user.

Note that workflow 610 may be performed within virtual edge appliance 620. As illustrated, incoming traffic may be received via switch 630. This traffic may be monitored and traced using embodiments herein. Based upon the traffic and given workflows, note that the various network functions and services may be performed in one or more of a platform 640, a graphics engine 650, an integrated network interface circuit 660, and a pooled memory 670. As shown, a appliance 620. Components in addition to switch 16 30. Platform 640 as representative of one or more such platforms within edge appliance 620. In an embodiment, platform 640 may include a plurality of processors, each of which may be implemented as multi-core processors, along with a system memory, e.g. formed of double data rate memory—mother such components. Further coupled to switch 630 is in the graphics engine 650 which in an embodiment may be implemented as a separate graphics card. Graphics engine 650 may include graphics processors or other accelerators to perform specialized functions. As shown, graphics engine 650 also may include DDR memory. A intelligence network interface circuit 660 also couples to switch 30. In an embodiment, Nick 660 may include high-bandwidth memory among other components. Finally as shown in FIG. 6, a pooled memory 670 also couples to switch 630. In an embodiment, pooled memory 670 may be implemented with DDR memory and may store incoming payloads or data units from various VNF support other services, which may be stored in a different queues. In turn, such information may be provided to other VNF store services to further processes such information.

With embodiments herein, edge appliance 620 may provide for multi-tenancy and may operate with high load variability. Or, to execute various function-based services. Further will be monitoring and tracing implemented within switch 630 as described herein various the quality of service metrics may be maintained for these different services to ensure compliance with SLA and other, e.g., resiliency requirements.

With the arrangement in FIG. 6, embodiments may efficiently and flexibly connect multiple VNFs and services using pooled resources through switch 630. In this context, edge appliance 620 enables flexible data movement and sharing across multiple edge cloud entities. Edge appliance 620 is thus a flexible architecture that can execute a variety of functions and/or services. As an example, appliance 620 can push payloads or data units (e.g., packets) from one VNF or service to pooled memory 670 to a queue meant to be used for consumption for another specific VNF or service or VNF or service or VNF type (e.g., firewall packets). In addition edge appliance 620 may pull payloads or data units from pooled memory 670 as requested by a specific VNF or service. For example, a VNF may seek access to its pool of memory or storage to retrieve data that has been pushed for it. Alternatively, the VNF or service can pull from the generic queues types (e.g., pull any payload or data unit meant to be consumed by a firewall VNF).

Edge appliance 620 may be implemented as a virtual edge platform, with switch 630 that connects accelerators, compute and storage to dynamically create (and scale up and down) platforms depending on the service chain requirements. This topology may include subscriber level agreements (SLA) and resiliency requirements between different parts of the topology. Thereby, a tenant may require specific bandwidth between two points of the topology and specific resiliency (e.g., replicate data to two different pooled memory drawers).

With embodiments that implement monitoring and tracing in switch 630 or other hardware, mechanisms are provided to monitor and validate SLAs associated with the functions paid for by a tenant. In this way, a cloud services provider and/or its tenants may use these mechanisms to understand resource utilization for the various functions and the SLA behavior. And users and system owners can understand and identify potential glass-jaws for this programming paradigm.

With an embodiment, monitoring and/or tracing information may be provided to enable an understanding of how I/O pooling or CXL-based types of architectures behave under multi-tenant and function-based architectures. Such information may enable effective monitoring of real-time complex flows (e.g., CXL.io/mem/cache) that may happen across thousands of functions from different service chains sharing the fabric.

Figure 7:
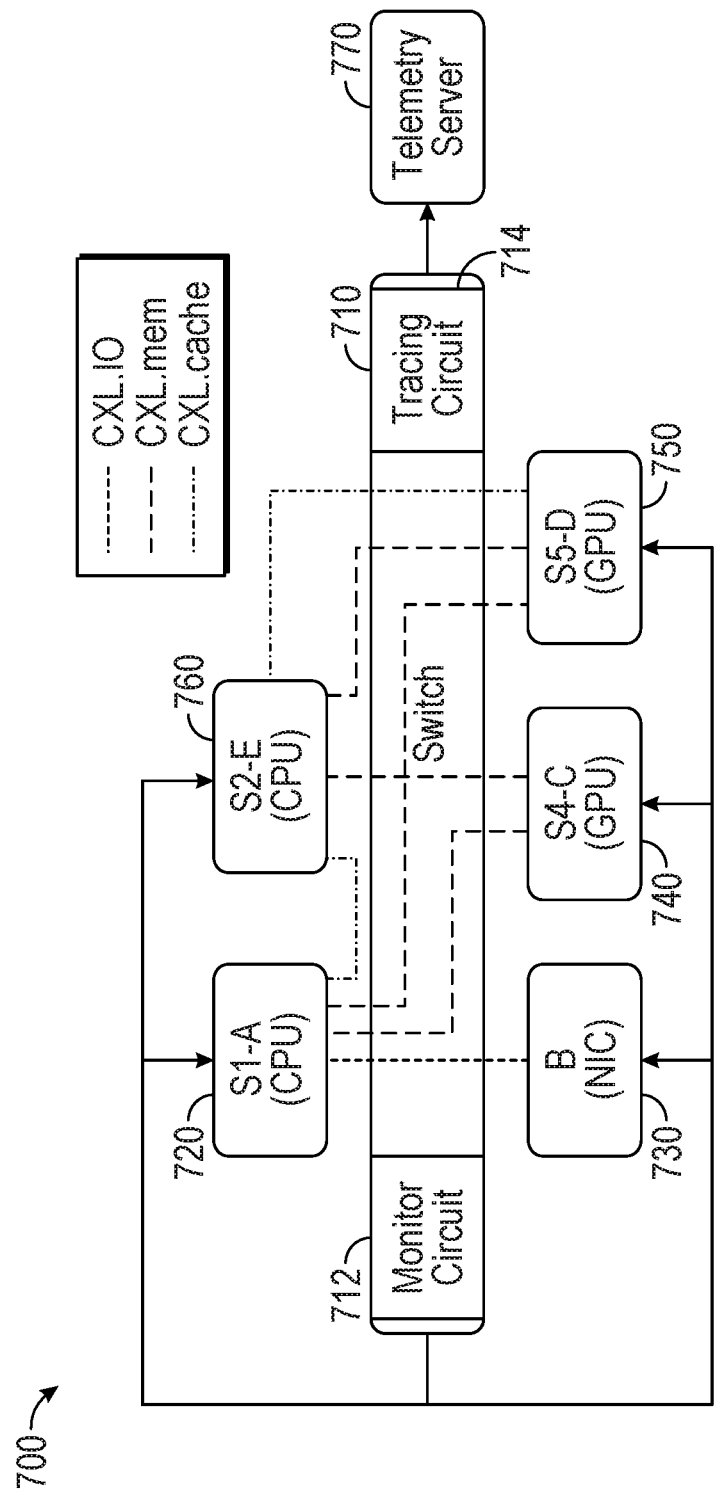
FIG. 7 is a block diagram of a portion of a data center architecture in accordance with an embodiment.

Referring now to FIG. 7, shown is a block diagram of a portion of a data center architecture in accordance with an embodiment. As shown in FIG. 7, system 700 may be a collection of components implemented as one or more servers of the of a data center. As illustrated, system 700 includes a switch 710, e.g., a CXL switch in accordance with an embodiment. By way of switch 710, which acts as a fabric, various components including one or more central processing units (CPUs) 720, 760, one or more special function units, such as graphics processing units (GPUs) 740, 750 and a network interface circuit (NIC) 730 may communicate with each other. More specifically, these devices, each of which may be implemented as one or more integrated circuits, provide for execution of functions that communicate with other functions in other devices via one of multiple CXL communication protocols. For example, CPU 720 may communicate with NIC 730 via a CXL.io communication protocol. In turn, CPUs 720,760 may communicate with GPUs 740,750 via a CXL.mem communication protocol. And, CPUs 720,760 may communicate with each other and from CPU 760 to GPU 750 via a CXL.cache communication protocol, as examples.

Using switch 710 in accordance with an embodiment having a monitor circuit 712 and a tracing circuit 714, interfaces may be exposed to the various platforms and components to specify advanced monitoring rules. These rules enable: (1) generation of automatic callbacks to specific software or hardware instances when determined conditions occur; and/or (2) activate advanced event tracing for certain flows, e.g., when some of the previous callbacks are activated.

For instance, with reference to FIG. 7, assume a service implemented with a chain of functions (S1, S2, S4 and S4) in respective devices (720 (A), 730 (B), 740 (C), 750 (D), and 760 (E)) that use the flows discussed above, represented as follows: A to B CXL.io; A to D, C CXL.mem/E to C,D CXL.mem; A to E CXL.cache/E to D CXL.cache. With an embodiment, services S1 and S2 may register the following rules shown in Table 1.

TABLE 1

If 1 GBs < (S1.A to B CXL.io BW) > 10 GBs then CallBack (S1, Monitoring Data)
If (S1.A to S4.C CXL.cache latency RD) > 100ms then CallBack (S1, Monitoring Data)
If (S2.E to D CXL.cache latency WR < 100 ms) then CallBack (S2, Monitoring

TABLE 1-continued

Data)
If (S1.A to S5.mem BW + S2.mem BW) > 50 then CallBack (S2, Monitoring Data)
& StartTracing(MESSAGES)
If (S1.A to S5.mem BW + S2.mem BW) < 45 then CallBack (S2, Monitoring Data)
& StopTracing(MESSAGES)

With this arrangement and in accordance with the above examples, one or more devices on which the functions and/or services are executed may send, for receipt in a switch, telemetry rule registration requests. In turn, the switch may store a telemetry rule for each of the telemetry rule registration requests in a telemetry rule database. Then during execution of the system including one or flows for these functions/services, the switch may, via a monitor circuit, monitor traffic through the switch associated with such functions/services that execute on at least some of the devices and maintain telemetry information associated with the traffic.

Then, in response to the telemetry information associated with a first device and based on a first telemetry rule for the first device, the switch, via the monitor circuit, may send a callback message to the first device, the callback message including at least some of the telemetry information associated with the first device.

Also in certain cases, such as illustrated in Table 1, in response to the first telemetry rule for the first device, the monitor circuit of the switch may send a tracing request to a trace circuit of the switch to cause the trace circuit to trace message traffic between the first device and a second device. Of course other examples are possible. For example, as further shown in Table 1, it is possible based on comparison of certain monitored information (e.g., cache latency metrics, memory bandwidth metrics or so forth) to one or more thresholds, to implement a callback to send at least some of the monitoring data to one or more services/functions and not implement tracing. And it is equally possible for tracing to be initiated for one or more services/functions to trace messages or other communications, without occurrence of a callback.

Thus embodiments provide very flexible and advanced mechanisms to track SLA, understand how complex flows behave, monitor in a scalable way, and allow identification of glass-jaws, potential bugs or even potential attacks without interfering with service performance. As a result, different levels of smart tracing schemes may be applied depending on requirements of a software stack. And embodiments thus enable, in function-based and edge platforms, fine-grained monitoring capabilities, particularly in cloud-based architectures.

Figure 8:
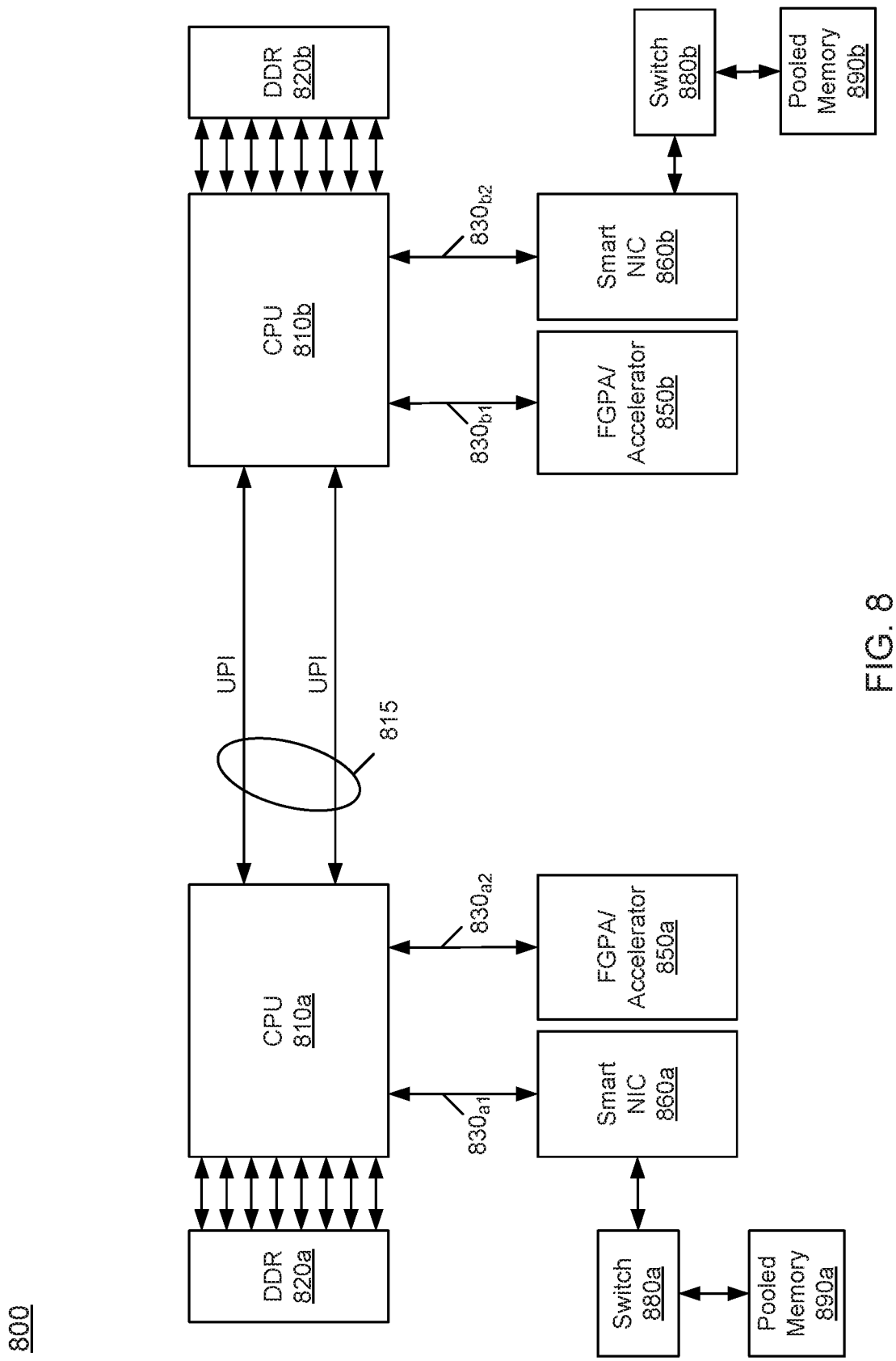
FIG. 8 is a block diagram of a system in accordance with another embodiment of the present invention.

Referring now to FIG. 8, shown is a block diagram of a system in accordance with another embodiment of the present invention. As shown in FIG. 8, a system 800 may be any type of computing device, and in one embodiment may be a server system such as an edge platform. In the embodiment of FIG. 8, system 800 includes multiple CPUs 810a,b that in turn couple to respective system memories 820a,b which in embodiments may be implemented as double data rate (DDR) memory. Note that CPUs 810 may couple together via an interconnect system 815 such as an Intel® Ultra Path Interconnect or other processor interconnect technology.

To enable coherent accelerator devices and/or smart adapter devices to couple to CPUs 810 by way of potentially multiple communication protocols, a plurality of interconnects 830a1-b2 may be present. In an embodiment, each interconnect 830 may be a given instance of a CXL.

In the embodiment shown, respective CPUs 810 couple to corresponding field programmable gate arrays (FPGAs)/accelerator devices 850a,b (which may include graphics processing units (GPUs), in one embodiment. In addition CPUs 810 also couple to smart NIC devices 860a,b. In turn, smart NIC devices 860a,b couple to switches 880a,b (e.g., CXL switches in accordance with an embodiment) that in turn couple to a pooled memory 890a,b such as a persistent memory. With an arrangement as in FIG. 8, CPUs 810 may direct certain workloads (e.g., graphics workloads) to devices 850 to perform processing on incoming information, which stores processed information in pooled memory 890. In turn, CPUs 810 or other entities may access and further process this information from pooled memory 890. And as such flows proceed through switches 880, the fine-grained monitoring and tracing may occur, as described herein.

Figure 9:
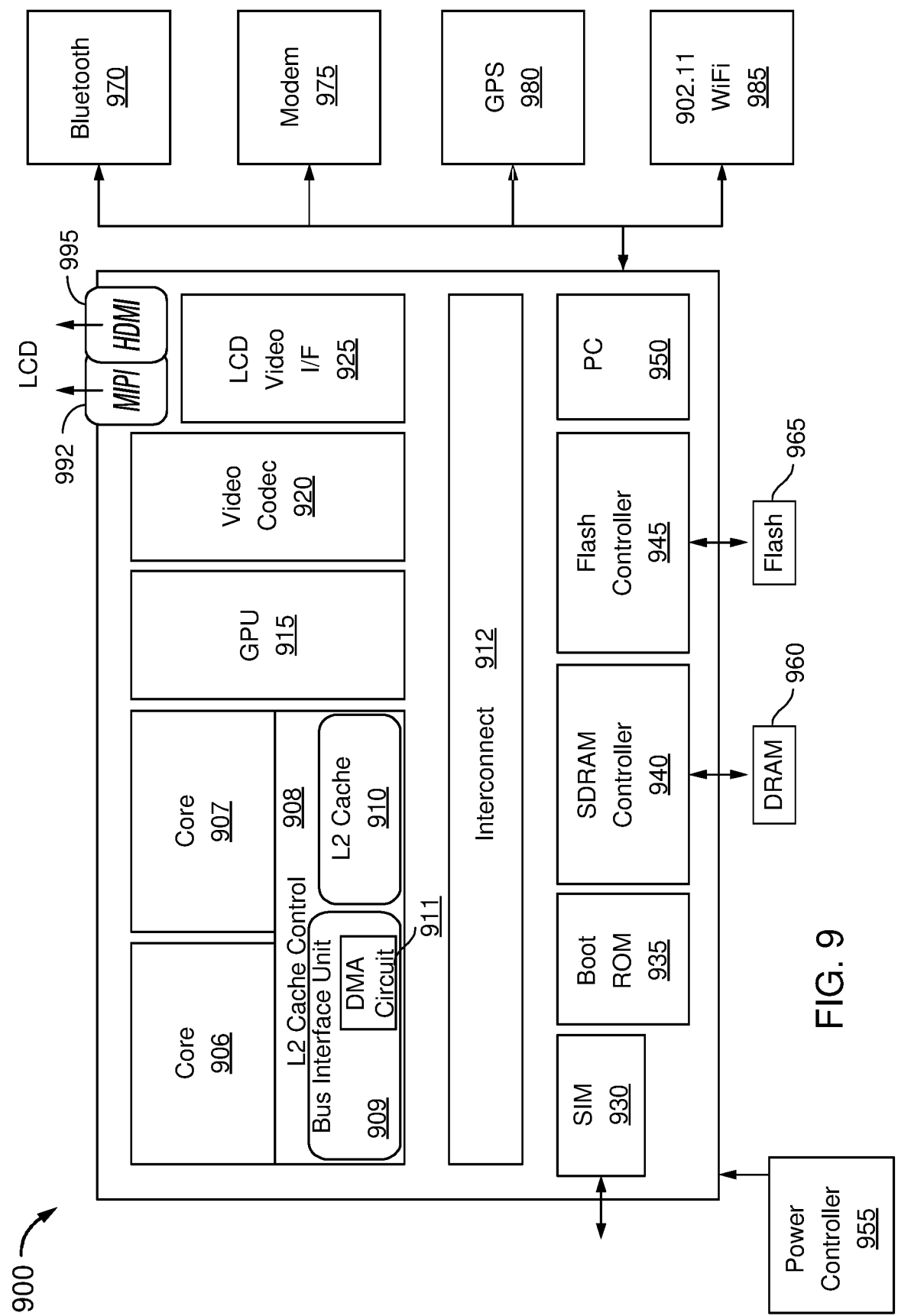
FIG. 9 is a block diagram of an embodiment of a SoC design in accordance with an embodiment.

Turning next to FIG. 9, an embodiment of a SoC design in accordance with an embodiment is depicted. As a specific illustrative example, SoC 900 may be configured for insertion in any type of computing device, ranging from portable device to server system. Here, SoC 700 includes 2 cores 906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache controller 908 that is associated with bus interface unit 909 and L2 cache 910 to communicate with other parts of system 900 via an interconnect 912. As seen, bus interface unit 909 includes a DMA circuit 911 configured to send write requests.

Interconnect 912 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g., DRAM 960), a flash controller 945 to interface with non-volatile memory (e.g., flash 965), a peripheral controller 950 (e.g., an eSPI interface) to interface with peripherals, video codec 920 and video interface 925 to display and receive input (e.g., touch enabled input), GPU 915 to perform graphics related computations, etc. In addition, the system illustrates peripherals for communication, such as a Bluetooth module 970, 3G modem 975, GPS 980, and WiFi 985. Also included in the system is a power controller 955. Further illustrated in FIG. 9, system 900 may additionally include interfaces including a MIPI interface 992, e.g., to a display and/or an HDMI interface 995 also which may couple to the same or a different display.

Figure 10:
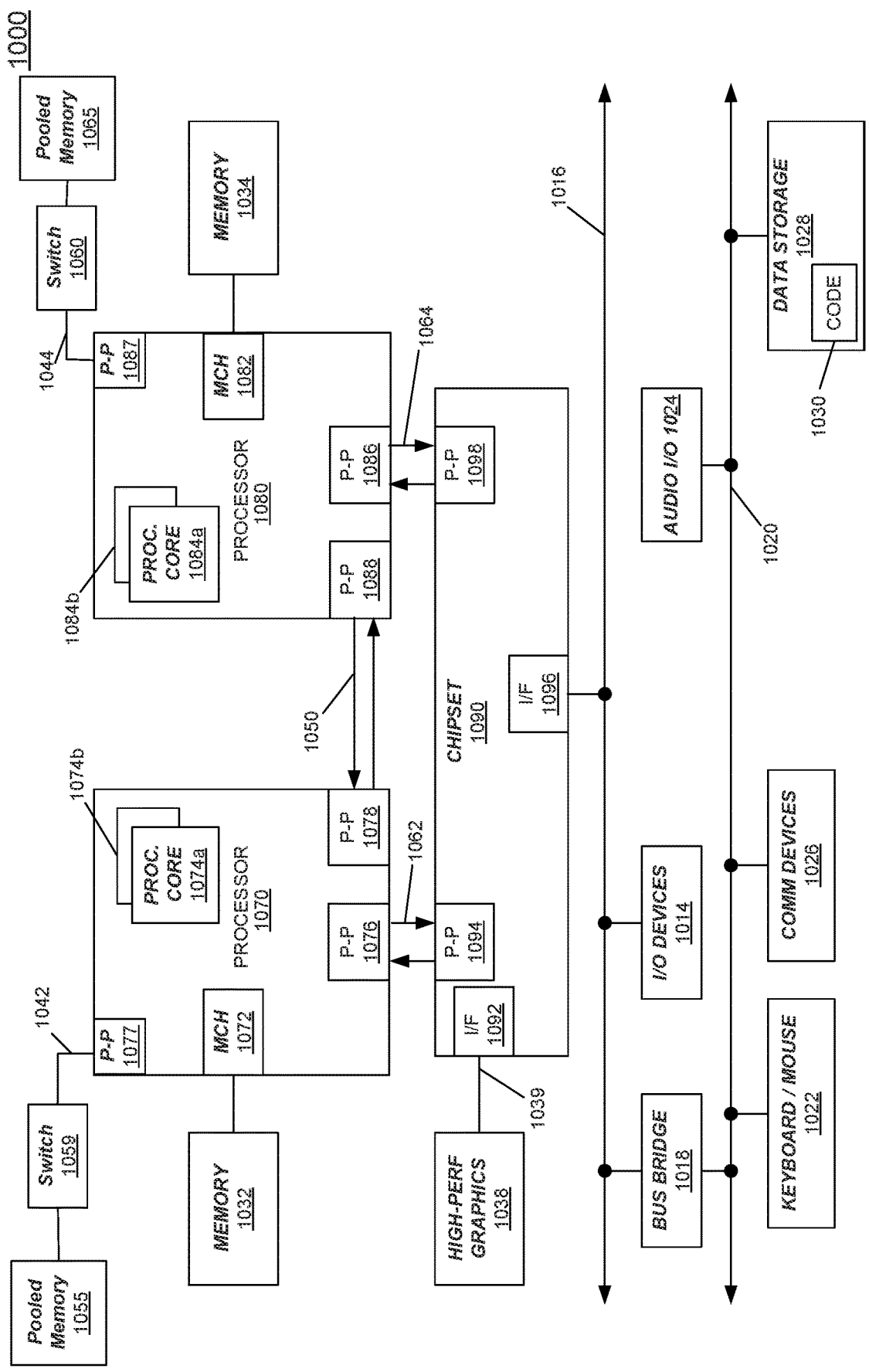
FIG. 10 is a block diagram of a system in accordance with another embodiment of the present invention.

Referring now to FIG. 10, shown is a block diagram of a system in accordance with another embodiment of the present invention such as an edge platform. As shown in FIG. 10, multiprocessor system 1000 includes a first processor 1070 and a second processor 1080 coupled via a point-to-point interconnect 1050. As shown in FIG. 10, each of processors 1070 and 1080 may be many core processors including representative first and second processor cores (i.e., processor cores 1074*a* and 1074*b* and processor cores 1084*a* and 1084*b*).

In the embodiment of FIG. 10, processors 1070 and 1080 further include point-to point interconnects 1077 and 1087, which couple via interconnects 1042 and 1044 (which may be CXL buses) to switches 1059 and 1060, which may perform fine-grained monitoring and tracing as described herein. In turn, switches 1059, 1060 couple to pooled memories 1055 and 1065. In this way, switches 1059, 1060 may, based on telemetry rules provided by, e.g., processors 1070 and 1080, perform monitoring and tracing of traffic in a fine-grained manner, as described herein.

Still referring to FIG. 10, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 10, MCH's 1072 and 1082 couple the processors to respective memories, namely a memory 1032 and a memory 1034, which may be portions of system memory (e.g., DRAM) locally attached to the respective processors. First processor 1070 and second processor 1080 may be coupled to a chipset 1090 via P-P interconnects 1076 and 1086, respectively. As shown in FIG. 10, chipset 1090 includes P-P interfaces 1094 and 1098.

Furthermore, chipset 1090 includes an interface 1092 to couple chipset 1090 with a high performance graphics engine 1038, by a P-P interconnect 1039. As shown in FIG. 10, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 824 may be coupled to second bus 1020.

Figure 11:
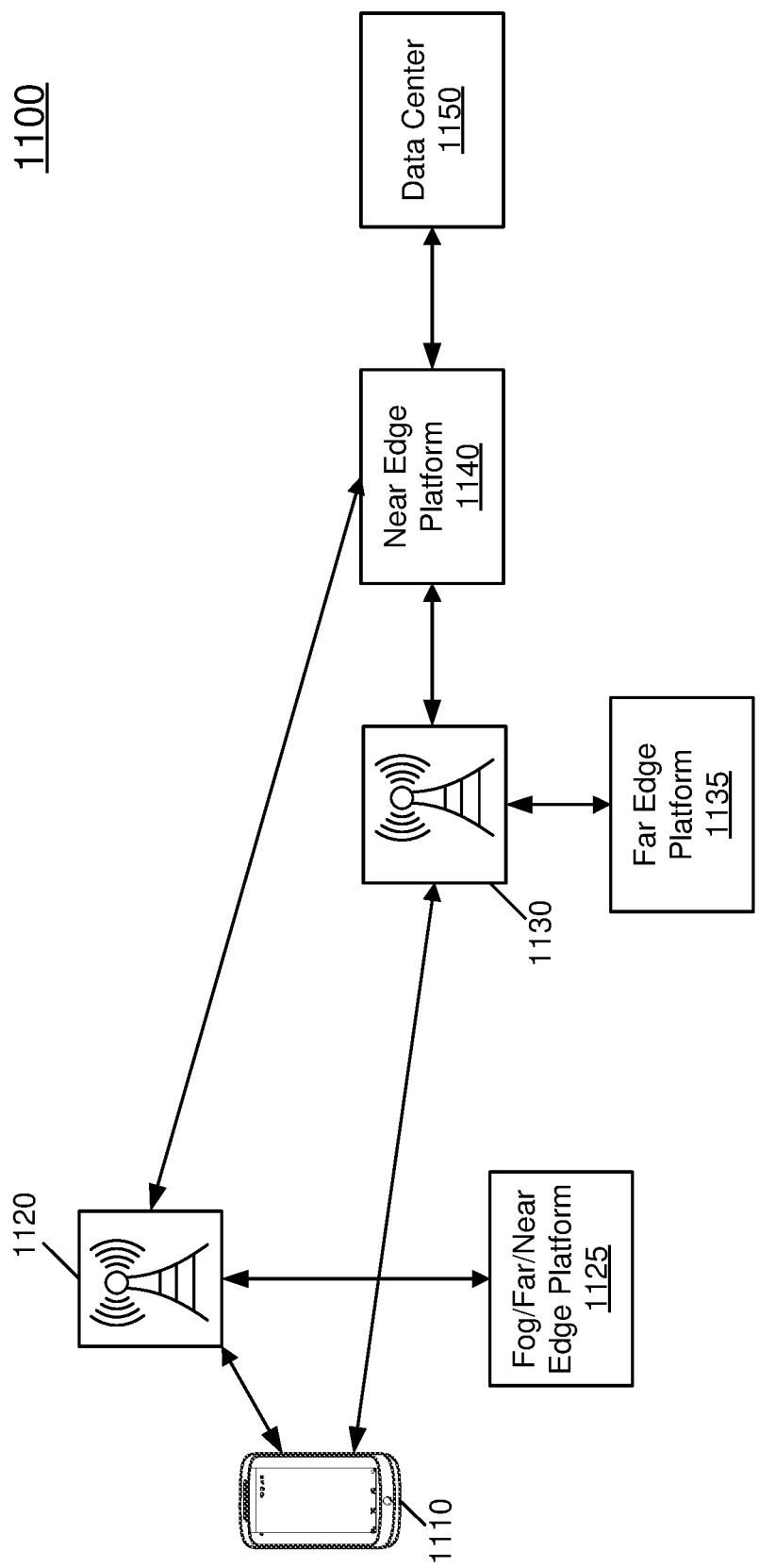
FIG. 11 is a block diagram of a network architecture in accordance with an embodiment.

Embodiments as described herein can be used in a wide variety of network architectures. To this end, many different types of computing platforms in a networked architecture that couples between a given edge device and a datacenter can perform the fine-grained monitoring and tracing described herein. Referring now to FIG. 11, shown is a block diagram of a network architecture in accordance with another embodiment of the present invention. As shown in FIG. 11, network architecture 1100 includes various computing platforms that may be located in a very wide area, and which have different latencies in communicating with different devices.

In the high level view of FIG. 11, network architecture 1100 includes a representative device 1110, such as a smartphone. This device may communicate via different radio access networks (RANs), including a RAN 1120 and a RAN 1130. RAN 1120 in turn may couple to a platform 1125, which may be an edge platform such as a fog/far/near edge platform, and which may leverage embodiments herein. Other requests may be handled by a far edge platform 1135 coupled to RAN 1130, which also may leverage embodiments.

As further illustrated in FIG. 11, another near edge platform 1140 may couple to RANs 1120, 1130. Note that this near edge platform may be located closer to a data center 1150, which may have a large amount of computing resources. By pushing messages to these more remote platforms, greater latency is incurred in handling requests on behalf of edge device 1110. Understand that all platforms shown in FIG. 11 may incorporate embodiments as described herein to perform fine-grained monitoring and tracing of disparate flows.

The following examples pertain to further embodiments.

In one example, an apparatus includes: a monitor circuit to monitor traffic of a plurality of sources through the apparatus and maintain telemetry information regarding the traffic based at least in part on telemetry rules received from the plurality of sources, where the monitor circuit is to determine whether to send a callback message to a selected one of the plurality of sources, the callback message including telemetry information associated with the traffic of the selected source through the apparatus; and a storage coupled to the monitor circuit, the storage to store the telemetry information, where the monitor circuit is to access the telemetry information from the storage.

In an example, the apparatus further comprises a telemetry rule storage, the telemetry rule storage including a plurality of entries each to store an identifier associated with a source, monitoring rule metadata and tracing event information.

In an example, the monitor circuit is to access a first entry of the telemetry rule storage associated with the selected source to determine whether to send the callback message.

In an example, the apparatus further comprises a tracing circuit to trace a first traffic flow from the selected source in response to a tracing request from the monitor circuit.

In an example, the monitor circuit is to send the tracing request based on the tracing event information in the first entry, and further in response to the determination to send the callback message.

In an example, the tracing circuit is to trace a plurality of messages from the selected source to a first destination in response to the tracing request.

In an example, the tracing circuit comprises one or more processing circuits to execute one or more bitstreams to trace the first traffic flow.

In an example, the tracing circuit comprises one or more processing circuits to execute a correlation bitstream to correlate the first traffic flow with source telemetry information received from the selected source.

In an example, the monitor circuit is to monitor the traffic of the selected source to a first destination and not monitor the traffic of the selected source to a second destination, based on the first entry of the telemetry rule storage associated with the selected source.

In an example, the apparatus comprises a switch coupled to the plurality of sources via a plurality of links, where the switch is to receive traffic of a plurality of communication protocols from the selected source via a corresponding one of the plurality of links.

In another example, a method comprises: receiving, in a switch coupled to a plurality of devices, telemetry rule registration requests from at least some of the plurality of devices; storing a telemetry rule for each of the telemetry rule registration requests in a telemetry rule database; monitoring traffic through the switch associated with the at least some of the plurality of devices and maintaining telemetry information regarding the traffic; and in response to the telemetry information associated with a first device and based on a first telemetry rule for the first device, sending a callback message to the first device, the callback message including at least some of the telemetry information associated with the first device.

In an example, the method further comprises in response to the first telemetry rule for the first device, sending a tracing request to a trace circuit of the switch to cause the trace circuit to trace message traffic between the first device and a second device.

In an example, the method further comprises sending tracing information associated with the message traffic between the first device and the second device to a telemetry server coupled to the switch.

In an example, the method further comprises based on the first telemetry rule, monitoring the traffic through the switch from the first device of a first communication protocol and not monitoring the traffic through the switch from the first device of a second communication protocol.

In an example, the method further comprises: routing the traffic of the first communication protocol from the first device to a second device coupled to the switch; and routing the traffic of the second communication protocol from the first device to a third device coupled to the switch.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, an edge system comprises: a platform having at least one processor and at least one system memory, where the at least one processor is to execute a first function; a switch coupled to the platform, and a pooled memory coupled to the switch, where the pooled memory is to store a first payload of the first function. In an example, the switch comprises: a monitor circuit to monitor traffic of a plurality of functions and maintain telemetry information regarding the traffic based at least in part on telemetry rules received from the plurality of functions, where the monitor circuit is to determine whether to send a callback message to a selected one of the plurality of functions, the callback message including telemetry information associated with the traffic of the selected function; and a storage coupled to the monitor circuit, the storage to store the telemetry information, where the monitor circuit is to access the telemetry information from the storage.

In an example, the edge system further comprises an accelerator coupled to the switch, the accelerator to receive the first payload and perform at least one operation on the first payload.

In an example, the switch is to push the first payload from the first function to the pooled memory and to pull the first payload and send the first payload to the accelerator.

In an example, the switch further comprises a tracing circuit to trace a first traffic flow from the first function in response to a tracing request from the monitor circuit, the monitor circuit to send the tracing request based on the tracing event information in the first entry, and further in response to the determination to send the callback message.

In an example, the tracing circuit is to trace a plurality of messages of the first traffic flow from the first function to the pooled memory in response to the tracing request, the tracing circuit comprising one or more processing circuits to execute one or more bitstreams to trace the first traffic flow.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a switch coupled to a plurality of sources via a plurality of links, wherein the switch is to receive traffic of a plurality of communication protocols from one or more of the plurality of sources, the switch comprising:
      a monitor circuit to monitor traffic of the plurality of sources through the switch and maintain telemetry information regarding the traffic based at least in part on telemetry rules, wherein the monitor circuit is to receive the telemetry rules from the plurality of sources;
      a telemetry rule storage, the telemetry rule storage including a plurality of entries each to store, for a rule of the telemetry rules, an identifier associated with a source that provided the rule, monitoring rule metadata and tracing event information to identify an action with respect to tracing for the rule, wherein the monitor circuit is to determine whether to send a callback message to a selected one of the plurality of sources, the callback message including telemetry information associated with the traffic of the selected source through the switch, and in response to a determination to send the callback message to trigger tracing based on the tracing event information; and a storage coupled to the monitor circuit, the storage to store the telemetry information, wherein the monitor circuit is to access the telemetry information from the storage.

2. The apparatus of claim 1, wherein the monitor circuit is to access a first entry of the telemetry rule storage associated with the selected source to determine whether to send the callback message.

3. The apparatus of claim 2, further comprising a tracing circuit to trace a first traffic flow from the selected source in response to a tracing request from the monitor circuit.

4. The apparatus of claim 3, wherein the monitor circuit is to send the tracing request to trigger the tracing based on the tracing event information in the first entry, and further in response to the determination to send the callback message.

5. The apparatus of claim 3, wherein the tracing circuit is to trace a plurality of messages from the selected source to a first destination in response to the tracing request.

6. The apparatus of claim 3, wherein the tracing circuit comprises one or more processing circuits to execute one or more bitstreams to trace the first traffic flow.

7. The apparatus of claim 3, wherein the tracing circuit comprises one or more processing circuits to execute a correlation bitstream to correlate the first traffic flow with source telemetry information received from the selected source.

8. The apparatus of claim 2, wherein the monitor circuit is to monitor the traffic of the selected source to a first destination and not monitor the traffic of the selected source to a second destination, based on the first entry of the telemetry rule storage associated with the selected source.

9. A non-transitory machine-readable medium having stored thereon instructions, which when performed by a machine cause the machine to perform a method comprising:

receiving, in a switch coupled to a plurality of devices, telemetry rule registration requests from at least some of the plurality of devices;

storing a telemetry rule for each of the telemetry rule registration requests in a telemetry rule database of the switch;

monitoring, in the switch, traffic through the switch associated with the at least some of the plurality of devices according to the telemetry rule for the at least some of the plurality of devices and maintaining telemetry information regarding the traffic;

in response to the telemetry information associated with a first device and based on a first telemetry rule for the first device, sending a callback message to the first device, the callback message including at least some of the telemetry information associated with the first device; and in response to the first telemetry rule for the first device, sending a tracing request to a trace circuit of the switch to cause the trace circuit to trace message traffic between the first device and a second device.

10. The non-transitory machine-readable medium of claim 9, wherein the method further comprises sending tracing information associated with the message traffic between the first device and the second device to a telemetry server coupled to the switch.

11. The non-transitory machine-readable medium of claim 9, wherein the method further comprises based on the first telemetry rule, monitoring the traffic through the switch from the first device of a first communication protocol and not monitoring the traffic through the switch from the first device of a second communication protocol.

12. The non-transitory machine-readable medium of claim 11, wherein the method further comprises:

routing the traffic of the first communication protocol from the first device to a second device coupled to the switch; and routing the traffic of the second communication protocol from the first device to a third device coupled to the switch.

13. An edge system comprising:

a platform having at least one processor and at least one system memory, wherein the at least one processor is to execute a first function;

a switch coupled to the platform, the switch to receive traffic of a plurality of communication protocols from one or more of a plurality of sources, each of the plurality of sources to execute at least one function of a plurality of functions, the switch comprising:

a monitor circuit to monitor traffic of the plurality of functions and maintain telemetry information regarding the traffic based at least in part on telemetry rules received from the plurality of functions, wherein the monitor circuit is to determine whether to send a callback message to a selected one of the plurality of functions, the callback message including telemetry information associated with the traffic of the selected function; and a storage coupled to the monitor circuit, the storage to store the telemetry information, wherein the monitor circuit is to access the telemetry information from the storage; and a pooled memory coupled to the switch, wherein the pooled memory is to store a first payload of the first function.

14. The edge system of claim 13, further comprising an accelerator coupled to the switch, the accelerator to receive the first payload and perform at least one operation on the first payload.

15. The edge system of claim 14, wherein the switch is to push the first payload from the first function to the pooled memory and to pull the first payload and send the first payload to the accelerator.

16. The edge system of claim 13, wherein the switch further comprises a tracing circuit to trace a first traffic flow from the first function in response to a tracing request from the monitor circuit, the monitor circuit to send the tracing request based on tracing event information to identify an action with respect to tracing of the first traffic flow, and further in response to the determination to send the callback message.

17. The edge system of claim 16, wherein the tracing circuit is to trace a plurality of messages of the first traffic flow from the first function to the pooled memory in response to the tracing request, the tracing circuit comprising one or more processing circuits to execute one or more bitstreams to trace the first traffic flow.

* * * * *